United States Patent

Narushima et al.

[11] Patent Number: 5,917,510
[45] Date of Patent: Jun. 29, 1999

[54] METHOD AND APPARATUS FOR CONTROLLING GRADATION IN INK JET PRINTER APPARATUS

[75] Inventors: Toshio Narushima, Kanagawa; Koichiro Kakinuma, Tokyo; Masao Araya, Kanagawa; Shinichiro Mikami, Chiba, all of Japan

[73] Assignee: Sony Corporation, Japan

[21] Appl. No.: 08/680,545

[22] Filed: Jul. 9, 1996

[30] Foreign Application Priority Data

Jul. 31, 1995 [JP] Japan .................................. 7-195178

[51] Int. Cl.$^6$ ...................................................... H04N 1/40
[52] U.S. Cl. ............................................ 347/15; 358/457
[58] Field of Search ..................... 347/15, 131; 358/457, 358/458, 459, 289; 395/109, 115

[56] References Cited

U.S. PATENT DOCUMENTS

| | | | |
|---|---|---|---|
| 4,673,951 | 6/1987 | Mutoh et al. ............................. | 347/15 |
| 4,746,928 | 5/1988 | Yamada et al. ........................... | 347/75 |
| 5,383,033 | 1/1995 | Takahashi .............................. | 358/456 |

FOREIGN PATENT DOCUMENTS

| | | |
|---|---|---|
| 59-176055 | 5/1984 | Japan . |
| 60-2372 | 8/1985 | Japan . |
| 61-199958 | 4/1986 | Japan . |

*Primary Examiner*—N. Le
*Assistant Examiner*—Anh T. N. Vo
*Attorney, Agent, or Firm*—Rader, Fishman & Grauer; Ronald P. Kananen

[57] ABSTRACT

A method for controlling gradation in an ink jet printer is provided which includes the steps of (a) reading input picture data in first memory means (b) determining the position of a pixel under consideration from the input picture data read out from the first memory means and for calculating an error $\in = X-X'$, where X is input picture data of the pixel under consideration and X' is a level of plural stages to be actually printed, (c) distributing the error $\in$ to surrounding pixels around the pixel under consideration, (d) replacing the input picture data of the surrounding pixels, to which the error has been distributed, based on the distributed error, (e) performing the steps (a) to (d) for all input picture data by way of dithering, (f) storing the dithered pixel data resulting from the step (e) in second memory means, (g) generating, from the dithered pixel data read out from the second memory means, output picture data controlling the ink dot diameter of each pixel, (h) D/A converting the output picture data and (i) impressing an output voltage resulting from D/A conversion across an electrostriction oscillator of the printing head for variably controlling the diameter of liquid droplets of the liquid ink discharged from the printing head.

10 Claims, 5 Drawing Sheets

| | | A1 | A2 | A3 | |
|---|---|---|---|---|---|
| L1 | . . . . . . . | | | | . . . |
| L2 | . . . . . | | $\varepsilon$ | $\frac{7}{16}\varepsilon$ | . . . |
| L3 | . . . . . . . | $\frac{3}{16}\varepsilon$ | $\frac{5}{16}\varepsilon$ | $\frac{1}{16}\varepsilon$ | . . . |

METHOD AND APPARATUS FOR CONTROLLING GRADATION IN INK JET PRINTER APPARATUS

BACKGROUND OF THE INVENTION

1. Field of the Invention

This invention relates to a method and apparatus for controlling the gradation of an ink jet printer apparatus configured for applying an electrical voltage to a electrostriction oscillator provided on a printing head for ejecting liquid ink for recording on a recording medium.

2. Description of the Related Art

In a color printer apparatus employing an ink jet type recording system, there are two primary methods for ejecting the ink: continuous ink ejection, in which the ink is continuously converted into liquid drops and only necessary liquid drops are sprayed onto a printing support material, and on-demand or intermittent ink ejection, in which the ink is formed into liquid drops for printing on a printing support material.

The on-demand type ink jet printer apparatus employs a printing head of an electromechanical conversion system in which a piezoelectric element is used as an electrostriction oscillator and the force of distortion of the piezoelectric element is utilized for varying the volume of an ink chamber for expelling the ink as liquid droplets via a nozzle. Alternatively, the on-demand type ink jet printer uses employs a printing head of a heating vaporization system, which is of the electro-mechanical conversion system, in which the ink is instantaneously heated and vaporized by a heating element annexed in the nozzle for expelling the ink via the nozzle under the pressure of generated air bubbles. The printing head of the electro-mechanical conversion system or the electrical heating conversion system is called a pressure pulse system printing head.

Specifically, the printing head of the electro-mechanical conversion system may be in the form of an oscillating cylinder type printing head in which a cylindrical electrostrictive oscillator is mounted on a lateral surface of a tube formed of glass or the like and an electrical voltage is impressed on the oscillator for causing changes in the ink chamber volume to expel ink particles. Alternatively, the printing head may be in the form of a planar plate oscillator type printing head in which a planar plate type electrostriction oscillator and an oscillator plate are bonded to each other to produce a bimorph to which an electrical voltage is applied to produce changes in the volume of an ink chamber for expelling the ink particles, or the printing head maybe in the form of a stem type printing head in which an ink supply conduit and a pressure chamber are separated as ink chambers and a bimorph is used for expelling ink particles.

For printing an image by the ink jet printer apparatus on a recording paper as a recording medium, liquid droplets of a liquid ink of a uniform size are expelled for reproducing the gradation using a two-gradation dithering method corresponding to the presence or absence of the ink liquid droplets. This dithering method resides in adding noise formed in accordance with a pre-set rule (dither) to input video signals for producing a bi-level signal using a pre-set threshold value. The dithering method may be classified into an independent decision method in which a threshold value independent of the input video signal is used for setting bi-level signals and a conditional decision method in which the threshold value is changed depending on the state of the input video signals. The independent decision method may further be classified into a random dithering method employing a random number uniformly distributing threshold values and a systematic dithering method employing periodic threshold values. The conditional decision method may further be classified into a mean error minimizing method for correcting the next pixel data value by a weighted mean value of errors of plural pixels, an error diffusion method of diffusing errors produced in a pixel to subsequent pixels, a mean value limitation method in which a threshold value is determined from a mean value of surrounding pixels for determining of a pixel under consideration, and a dynamic threshold method aimed at compressing the gradation picture.

In the above-described ink jet printer device, having the printing head of the electro-mechanical conversion system and designed to reproduce the gradation using the dithering method, the printed image has insufficient gradation because the image is printed with liquid droplets of liquid ink of unitary size by the dithering method designed for reproducing two gradation steps.

Moreover, when raising the gradation of the image, the image is lowered in effective resolution due to use of the dithering method.

In the ink jet printer device, having the thermo-electric conversion type printing head and designed to reproduce the gradation using the dithering method, the size of the ink liquid droplets corresponding to the data value to be printed, that is the dot diameter on the paper, is not changed, and hence the printed image has insufficient gradation because the principle of generation of the ink liquid droplets is dependent on the phenomenon of ink vaporization.

In JP Patent Kokoku Publication JP-B-6-39185 (1984), there is disclosed a simple dithering method in which the ink liquid droplet is varied in diameter responsive to the input digital value for reproducing multiple gradations. The method disclosed in this publication, however, requires gradation correction due to fluctuations in ink discharging characteristics and voltage to liquid droplet diameter characteristics of the electrostriction oscillator.

SUMMARY OF THE INVENTION

It is a principal object of the present invention to provide a method and apparatus for gradation control of an ink jet printer apparatus devoid of the above-mentioned inconveniences.

In one aspect, the present invention provides a method for controlling gradation in an ink jet printer including the steps of (a) reading input picture data in first memory means, (b) determining the position of a pixel under consideration from the input picture data read out from the first memory means and for calculating an error $\in = X - X'$, where X is input picture data of the pixel under consideration and X' is a level of plural stages to be actually printed, (c) distributing said error $\in$ to surrounding pixels around the pixel under consideration, (d) replacing the input picture data of the surrounding pixels, to which the error has been distributed, based on the distributed error, (e) performing the steps (a) to (d) for all input picture data by way of dithering, (f) storing the dithered pixel data resulting from the dithering step (e) in second memory means, (g) generating, from the dithered pixel data read out from the second memory means, output picture data controlling the ink dot diameter of each pixel, (h) D/A converting the output picture data, and (i) impressing an output voltage resulting from DsA conversion across an electrostriction oscillator of the printing head for variably controlling the diameter of liquid droplets of the liquid ink discharged from the printing head.

In another aspect, the present invention provides a device for controlling gradation of an ink jet printer apparatus including (a) first memory means for reading input picture data, (b) dithering controlling means having a step (i) of determining the position of a pixel under consideration from the input picture data read out from the first memory means and for calculating an error ∈=X–X', where X is input picture data of the pixel under consideration and X' is a level of plural stages to be actually printed, (ii) distributing the error ∈ to surrounding pixels around the pixel under consideration; (iii) replacing the input picture data of the surrounding pixels, to which the error has been distributed, based on the distributed error, and (iv) performing the steps (i) to (iii) for all input picture data by way of dithering, (c) second memory means for storing the dithered picture data obtained by the dithering controlling means, (d) means for generating, from the dithered pixel data read out from the second memory means, output picture data controlling the ink dot diameter of each pixel, and storing the generated output picture data, (e) D/A converter means for D/A converting the output picture data, and (f) a head driving unit for impressing an output voltage of the D/A converter across an electrostriction oscillator of the printer head for variably controlling the diameter of liquid droplets of the liquid ink discharged via a printer head.

With the ink jet printer apparatus according to the present invention, the dithering controlling means manages control for displaying each pixel in multiple gradation, using the dithering method, while a ink controlling means variably controls the diameter of liquid droplets of the liquid ink constituting each pixel for discharging the liquid droplets of the liquid ink via the printing head. This enables picture data to be printed stably in multiple gradation, while keeping the effective resolution of the picture to a tolerable level. Since the printer head employed in the invention exploits displacement of an electrostriction oscillator that does not use heat for operation, thus allowing the ink vulnerable to heat (dyestuffs) to be used and enhancing the possible range of ink type selection.

DETAILED DESCRIPTION OF THE PREFERRED EMBODIMENTS

Figure 1:
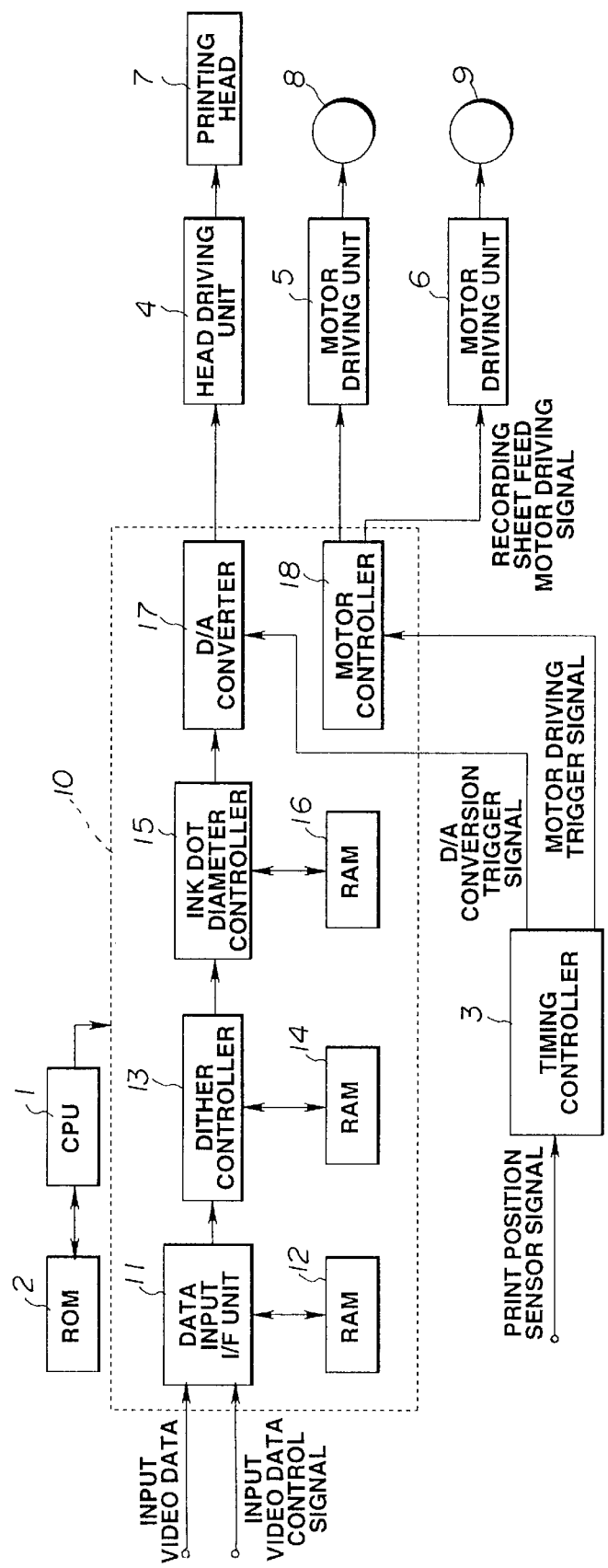
FIG. 1 is a block diagram showing an ink jet printer apparatus having a gradation control device according to the present invention.

Referring to the drawings, preferred embodiments of the present invention will be described in detail.

FIG. 1 shows, in a block diagram, an ink jet printer apparatus employing a gradation control device according to the present invention. The ink jet printer apparatus includes a dithering controller 13, which is a dithering display control means for representing each pixel with multiple gradation using a dithering method for adding dither to a data value of each pixel for representing the data value in multiple levels using pre-set plural threshold values for reproducing the gradation, and an ink dot diameter controller 15, which is an ink control means for variably controlling the diameter of the liquid ink droplets constituting each pixel in plural stages. The ink jet printer apparatus also includes a printing head 7 for discharging liquid droplets of the liquid ink controlled in diameter by the dither controller 13 and the ink dot diameter controller 15.

The operation of the ink jet printer apparatus will now be explained in detail.

To a drive controller 10 of the ink jet printer apparatus shown in FIG. 1, there is supplied, as input picture data, data of a picture to be printed from outside.

The particular method for representing a picture employed in this ink jet printer apparatus in multiple gradation is selected by a CPU 1 by a program stored in a read only memory (ROM) that is automatically sent to the CPU 1 or by contents manually entered by a user via a keyboard, (not shown) and sent to the CPU 1.

For representing the picture in multiple gradation, three methods, for example, may be optionally employed. The first method involves matching the diameter of the ink liquid diameter on the recording medium, that is the ink dot diameter, to a size suited to the half tone. The second method involves reducing the ink dot diameter to a value one to two stages smaller than the size suited to the halftone and arraying the ink liquid diameter in surrounding pixels with smaller ink dot diameters for comprehensively representing the halftone, while the third method includes arraying a number of liquid ink droplets with smaller diameters for comprehensively representing the halftone. With the first method, the picture has high effective resolution, however, the larger ink dot diameter is used, so that the picture has poor graininess. Therefore, the second or third method is used for picture printing for a portrait for which graininess is to be improved at the cost of the lowering in effective resolution, while the first method is used for printing a picture for a design drawing or the like for which high effective resolution is desirable even if the graininess is lowered. The second method is used for a picture for which both the effective resolution and graininess are required. If it is desirable to partially vary high effective resolution and graininess in a single picture, and it is possible to measure partially high effective resolution and graininess, automatic switching between the first, second and the third methods may be made under control by the CPU 1.

In the driving controller 10, the picture data for dithering with multiple gradation is substituted for the input picture data, and the picture data for dithering is controlled as to the ink liquid droplet diameter of the picture data for dithering, that is the ink dot diameter, and subsequently outputted as a head driving signal for controlling the head driving unit 4. The driving controller 10 also outputs a head feed motor driving signal to a motor driving unit 5.

The detailed operation of the driving controller 10 is now explained.

Picture data entering the driving controller 10 is stored in a first RAM 12 via a data input interfacing unit (data input I/F unit 11). The data input I/F unit 11 manages control to avoid overflow of input picture data in the RAM 12. When the input picture data in the RAM 12 reaches an upper limit of the storable amount of the RAM 12, the data input I/F unit 11 outputs an input picture data control signal to outside to stop entry of the picture data. When the picture data of the entire picture or several lines of picture data are stored in the RAM 12, the stored input picture data is sent to a dithering controller 13.

The dithering controller 13 stores the picture data supplied thereto in a second RAM 14 and then substitutes picture data to be printed, or picture data for dithering, for the stored input picture data, by the dithering method. The dithering picture data, thus substituted, is again stored in the RAM 14. If the RAM 14 has storage capacity sufficient to store the dithering picture data in its entirety, picture data substitution is done by the dithering method after storage of all input picture data. If the RAM 14 does not have a storage capacity sufficient to store the dithering picture data in its entirety, several lines of the dithering picture data is stored in the RAM 14. The picture data for dithering, stored in the RAM 14, is sent to an ink dot diameter controller 15.

The ink dot diameter controller 15 stores the dithering picture data supplied thereto in a third RAM 16 and subsequently generates output picture data corresponding to the dithering picture data controlled as to ink dot diameter of each pixel. When an amount of the output picture data corresponding to the number of pixels driving the printing head 7 is stored in the RAM 16, this output data is sent as a D/A (digital/analog) conversion control signal to a D/A (digital/analog) converter 17.

That is, the picture data for dithering is converted into output picture data conforming to the voltage-to-ink liquid droplet diameter characteristics of the electrostriction oscillator, as will be explained subsequently.

Moreover, the output picture data is converted on the basis of ink discharging characteristics and ink viscosity. For example, if the picture data for dithering is [0,63,127,199, 255], it is converted into output picture data [0,102,153,204, 255] depending on the ink discharging characteristics.

The D/A converter 17 converts the output picture data by D/A conversion and outputs the converted data.

The timing controller 3 is fed with a print position sensor signal to output a motor driving triggering signal to a motor controller 18. The motor controller 18 outputs a head feed motor driving signal to the driving unit 5, based on the motor driving trigger signal, while outputting a recording paper feed motor driving signal to a driving unit 6. The motor driving unit 5 outputs the voltage and current values capable of driving the head feed motor 8 as a motor pulse to the head feed motor 8, based on the head feed motor driving signal, for driving the head feed motor 8. The motor driving unit 5 also outputs the voltage and current values capable of driving the recording paper feed motor 9 as a motor pulse to the recording paper feed motor 9, based on the recording paper feed motor driving signal, for driving the recording paper feed motor 9.

When the head feed motor 8 is started, and a nozzle of the printing head 7 reaches a printing position on the recording paper, the timing is sensed by the timing controller 3, which then outputs a D/A conversion trigger signal to the D/A converter 17. Based on the D/A conversion trigger signal, the D/A converter 17 converts output picture data from the RAM 16 into analog signals, that is a pre-set voltage level.

Figure 2:
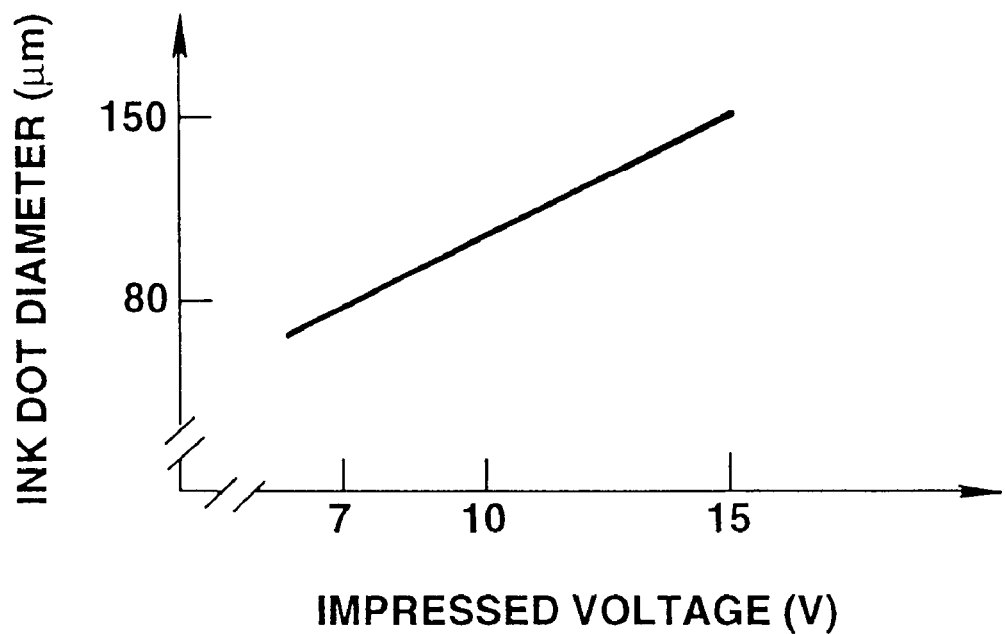
FIG. 2 shows the relation between the impressed voltage and the dot diameter.

Specifically, the output picture data is converted into a voltage level for impression to the electrostriction oscillator, as later explained, corresponding to the diameter of the liquid ink droplet on the recording paper of each pixel of picture data, that is the ink dot diameter, as shown in FIG. 2. The relationship between the ink dot diameter and the voltage level is previously set on the basis of changes in impressed waveforms due to electro-static charges or hysteresis characteristics as unstable factors of displacements of the electrostriction oscillator, errors in ink discharging characteristics caused by fluctuations in the assembling of the printer head, as unstable factors of ink discharging of the printer head 7 in its entirety, fluctuations in the ink discharging characteristics caused by physical properties of the ink, such as viscosity, characteristics of an oscillation plate, as later explained, or changes in the liquid ink droplet diameter on the recording paper with respect to changes in the impressed voltage.

The analog signal from the D/A converter 17 is sent as a head driving signal to the head driving unit 4. The head driving unit 4 amplifies the head driving signal to a power required for displacing the electrostriction oscillator and outputs the amplified signal as a head impression signal to the printer head 7. The required power is not less than 7 V. This effects printing of the picture data on the recording paper by the printing head 7.

The recording paper feed motor 9 occasionally feeds the recording paper in a timed relationship to the driving of the printing head 7.

The feed of the recording paper and the printing head and the impression of an electrical voltage across the printer head may occur by repetition of the above sequence of operations.

Figure 3:
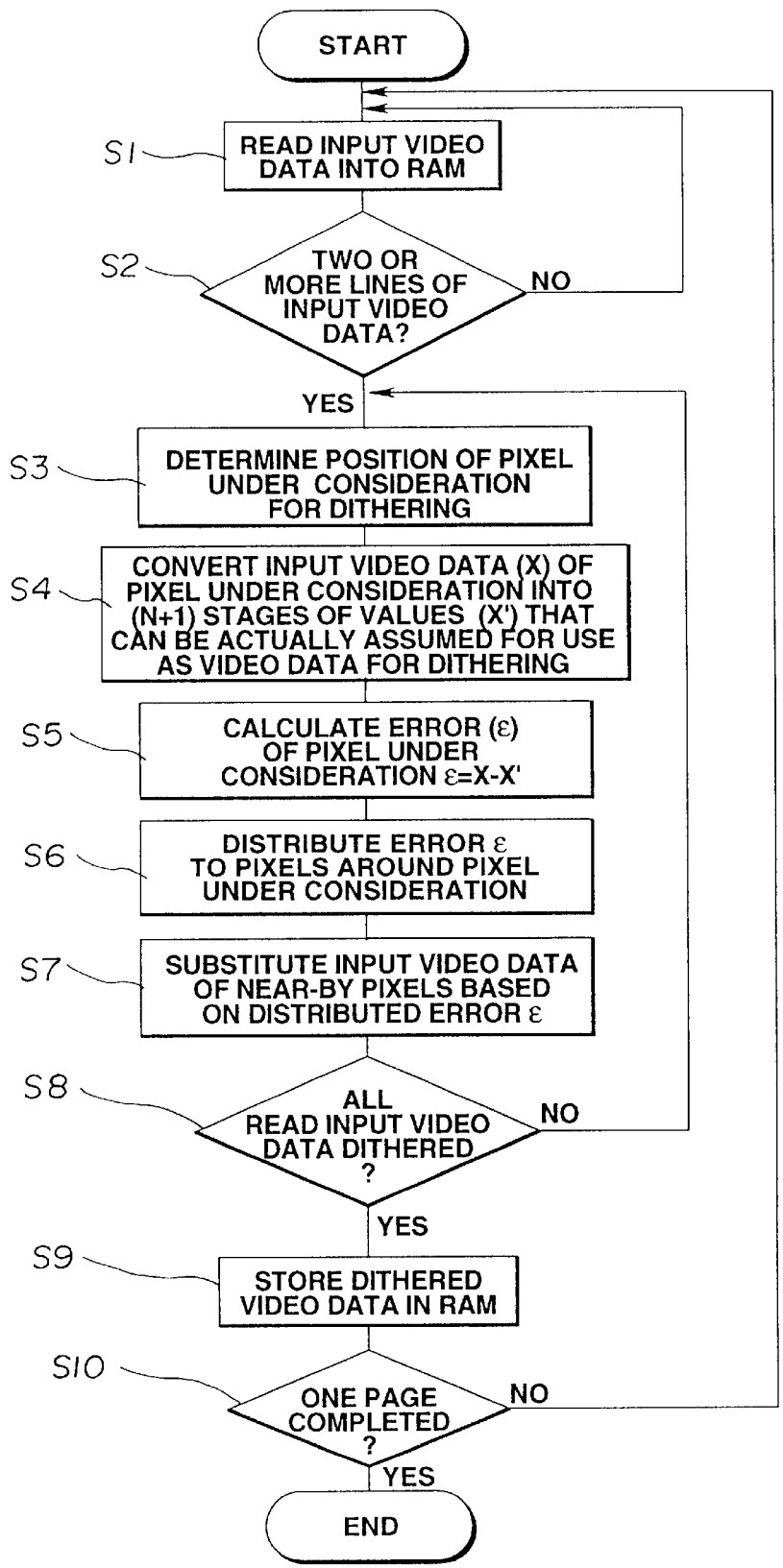
FIG. 3 is a flowchart showing an operational sequence of a dithering controller.

The control operation for the dithering controller 13 is explained by referring to the flowchart of FIG. 3. Specifically, the method of reproducing multiple gradations using the error diffusion method among the dithering methods is explained.

At step S1, input picture data is read into the RAM 14. If it is found at step S2 that two or more lines of the input picture data has been read into the RAM 14, the position of the pixel for dithering under consideration is set at step S3. Specifically, of the lines $L_1$, $L_2$, $L_3$, . . . , the line $L_2$ is the line under consideration, and a pixel $A_2$ in this line $L_2$ is a pixel under consideration.

Then, if the input level of the input picture data of the pixel under consideration $A_2$ is X, this input picture data X is converted at step S4 to levels X' with (N+1) stages of actually possible levels to be used as picture data for dithering. Specifically, if, at step S4, the error of the pixel under consideration is $\in$, such error $\in$ may be calculated by the following equation (1):

$$\in = X - X'' \tag{1}$$

where X is an input level of the picture data itself, which is desired to be printed, and X' is the level of the actually printed plural stages corresponding to the voltage afforded to the electrostriction oscillator.

The input level X does not have less than 256 gradations, while there are only several sorts of input levels X', usually stages 4, 6, 8 and 16. For converting the input level X into the level X', there is a first method in which the input level is converted into a level X' among the (N+1) stages that is closest to the input level X. There is also a second method in which a value closest to the value of the input level X among the (N+1) stages is assumed to have the highest possibility, with a value having a value remotest from the input level being assumed to have the lowest possibility.

Then, at step S6, the error $\in$ is distributed among pixels lying around the pixel under consideration $A_2$. The pixels to which the error is distributed and the distribution ratio may be selected as the occasion may demand. For example, the error $\in$ may be distributed to the pixels around the pixel under consideration, or variable values of probability may be accorded to the pixels around the pixel under consideration for reflecting the error ∈ in a particular one of the pixels. Specifically, in distributing the error ∈ among all surrounding pixels, 7/16∈, 3/16∈, 5/16∈ and 1/16∈ are allocated to a pixel $A_3$ neighboring to the pixel under consideration $A_2$ of the line $L_2$ and to the pixels $A_1$, $A_1$, and $A_1$, of the line $L_3$ next to the line under consideration.

At step S7, the input picture data of the surrounding pixels are replaced based on the distributed data. If the minimum printing level or the maximum printing level is exceeded, excess portions are rounded and the rounded portions are disregarded for setting the minimum printing level or the maximum printing level. Alternatively, the rounded portions are redistributed among the surrounding pixels with the above probability values. The input picture data thus read into the RAM 14 of FIG. 1 is processed as described above for generating dithered picture data for printing.

It is then determined at step S8 whether or not the input picture data has been converted in its entirety into dithered picture data for printing.

If it is determined that not all of the input picture data has been converted, processing reverts to step S3 where the position of the next pixel under consideration is determined and the control operations of the steps S4 to S7 for dithering are carried out. If it is determined that all of the input picture data has been converted, processing transfers to step S9 where the dithered picture data is stored in the RAM 14. It is then determined at step S10 whether or not one-page input picture data has been dithered. If it is determined at step S10 that one-page input picture data has been dithered, the control operation for dithering comes to an end. If it is determined at step S10 that one-page input picture data has not been dithered, processing reverts to step S1 in order to read the next picture data sent from the data input I/F unit 11 into the RAM 14. The control operations from step S2 to step S9 are then carried out for this next input picture data.

Figures 4, 5:
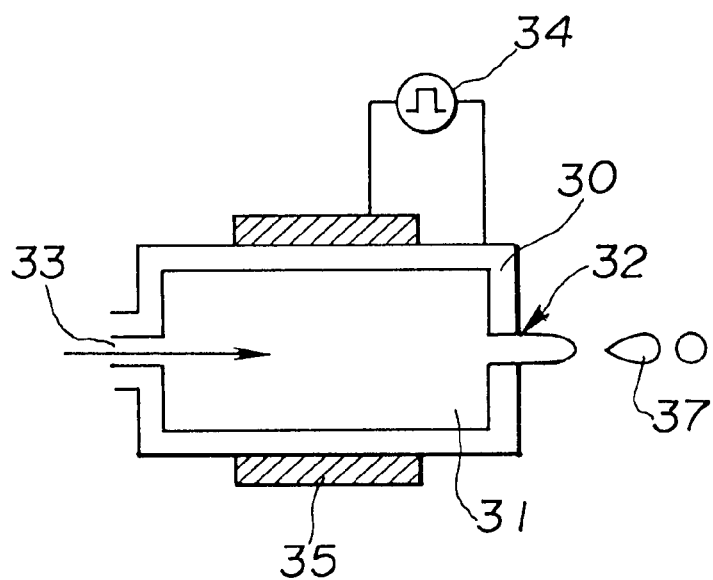
FIG. 4 illustrates an error diffusion method for reproducing multiple gradation.
FIG. 5 is a side view of a first printing head employed in the ink jet printer apparatus shown in FIG. 1.
Figure 6:
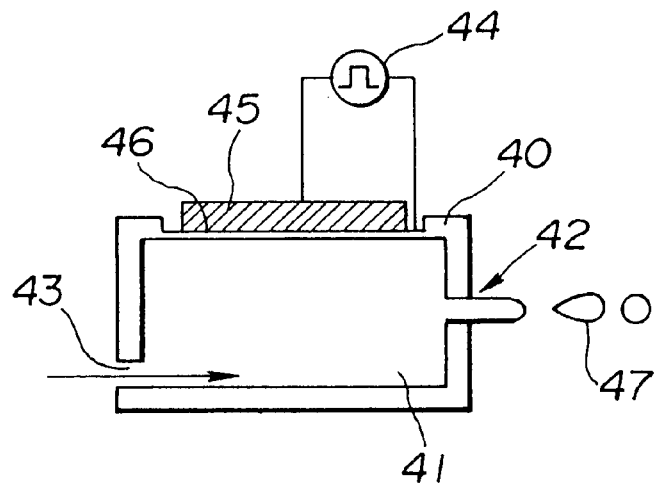
FIG. 6 is a side view of a second printing head employed in the apparatus shown in FIG. 1.
Figure 7:
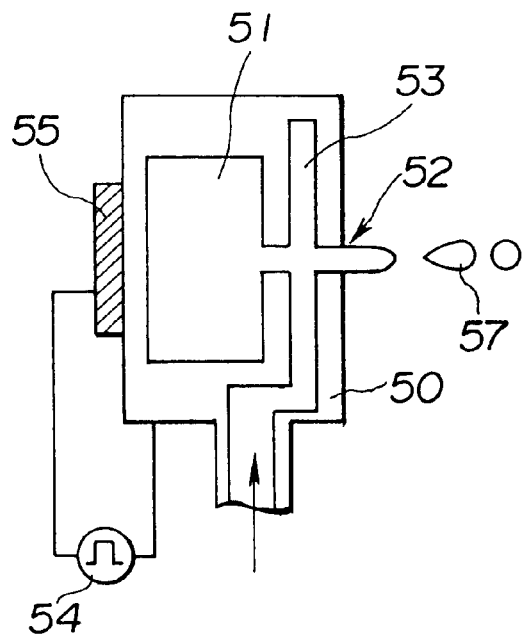
FIG. 7 is a side view showing a third printing head employed in the apparatus shown in FIG. 1.

Specifically, one of the printing heads 7 constructed as shown, for example, in FIGS. 5 to 7 is employed as the printing head 7 employed in the ink jet printer apparatus according to the present invention.

The first printer head, as shown in FIG. 5, is a cylindrical oscillator type head comprised of a cylindrically-shaped electrostriction element 35 mounted on a lateral surface of a cylindrically-shaped glass tube 30. The ink is supplied into an ink chamber 31 via an ink supply duct 33. With the first printing head, an electrical voltage is applied to the cylindrically-shaped electrostriction element 35 by a head impression signal generated by a recording signal source 34 provided with the head driving unit 4 and the driving controller 10 for generating volumetric changes in an ink chamber 31 and discharging the ink liquid droplets of the ink chamber 31 as ink particles 37 via an orifice 32.

The second printing head, shown in FIG. 6, is a flat plate oscillator type in which a diaphragm 46 is bonded to a printing head base 40 and a planar plate type electrostriction element 45 is bonded to the top of the diaphragm 46. The ink is supplied via an ink supply duct 43 into an ink chamber 41. With the second printing head, an electrical voltage is applied to the planar plate type electrostriction element 45 by a head impression signal generated by a recording signal source 44 for generating volumetric changes in the ink chamber 41 and discharging the ink liquid droplets of the ink chamber 41 as ink particles 47 via an orifice 42.

The third printing head, shown in FIG. 7, has an ink chamber and an ink supply duct 53 within the inside of a printing head base 50. It is of a stem type (double-chamber type) having a planar plate shaped electrostriction element 55 mounted on a side of the printing head base 50 facing the ink chamber 51. With the third printing head, an electrical voltage is applied to the planar plate type electrostriction element 55 by a head impression signal generated by a recording signal source 54 for generating volumetric changes in the ink chamber 51 and discharging the ink liquid droplets of the ink chamber 51 as ink particles 57 via an ink supply duct 53 and an orifice 52.

What is claimed is:

1. A method for controlling gradation in an ink jet printer comprising the steps of:

(a) reading input picture data corresponding to at least one pixel from a first memory means;

(b) determining the position of a selected pixel in the input picture data read from the first memory means and calculating an error e=X−X', wherein X is an input level of the selected pixel and X' is a level of data to be actually printed, X' being selected from a plurality of stages;

(c) distributing the error e to pixels surrounding the selected pixel;

(d) replacing input picture data of the pixels surrounding the selected pixel, to which the error has been distributed, based on the distributed error to generate dithered pixel data;

(e) storing the dithered pixel data in a second memory means;

(f) generating, from the dithered pixel data read from said second memory means, output picture data that controls a liquid ink droplet diameter;

(g) D/A converting said output picture data to obtain a variable output signal; and (h) sending the variable output signal obtained from said D/A conversion step to a printing head for varying the diameter of liquid ink droplets discharged from said printing head to generate pixels containing ink dots with variable diameters.

2. The method as claimed in claim 1, wherein said step of generating output picture data controlling the liquid ink droplet diameter includes generating data corresponding to ink discharging characteristics of the printing head.

3. The method as claimed in claim 1, wherein said step of generating output picture data controlling the liquid ink droplet diameter includes generating data corresponding to the viscosity of the liquid ink in the printing head.

4. The method as claimed in claim 1, wherein the variable output signal controlling the liquid ink droplet diameter is a variable output voltage applied across an electrostriction element in the printing head to vary the diameters of the liquid ink droplets.

5. The method as claimed in claim 4, wherein the output voltage applied across the electrostriction element in the printing head is varied for variably controlling the diameter of the liquid ink droplets over more than one of the plurality of stages from which X' is selected.

6. A device for controlling gradation of an ink jet printer apparatus comprising:

(a) first memory means for storing input picture data having a plurality of pixels;

(b) dithering controlling means having (i) means for determining the position of a selected pixel from the input picture data from the first memory means and for calculating an error e=X−X', wherein X is an input level of the selected pixel and X' is a level of data to be actually printed, X' being selected from a plurality of stages; (ii) means for distributing the error e to pixels surrounding the selected pixel; (iii) means for replacing input picture data of the pixels surrounding the selected pixel, to which the error has been distributed, based on the distributed error to generate dithered pixel data;

(c) second memory means for storing the dithered picture data generated by said dithering controlling means;

(d) means for generating, from the dithered pixel data read out from said second memory means, output picture data that controls a liquid ink droplet diameter;

(e) D/A converter means for D/A converting said output picture data to obtain a variable output signal; and (f) a head driving unit for sending the output signal from said D/A converter to a printer head for varying the diameter of the liquid ink droplets discharged from said printing head to generate pixels containing ink dots with variable diameters.

7. The apparatus as claimed in claim 6, wherein said generating means generates data corresponding to ink discharging characteristics of said printing head.

8. The apparatus as claimed in claim 6, wherein said generating means generates data corresponding to the viscosity of the liquid ink in said printing head.

9. The apparatus as claimed in claim 6, wherein the variable output signal controlling the liquid ink droplet diameter is a variable output voltage applied across an electrostriction element in the printer head to vary the diameters of the liquid ink droplets.

10. The apparatus as claimed in claim 9, wherein the output voltage applied across said electrostriction element in the printing head is varied for variably controlling the diameter of the liquid ink droplets over more than one of the plurality of stages from which X' is selected.

* * * * *